Aug. 9, 1960 D. W. ROPER ET AL 2,948,268
ENGINE ACCESSORY AND DRIVE MECHANISM THEREFOR
Filed Aug. 26, 1957
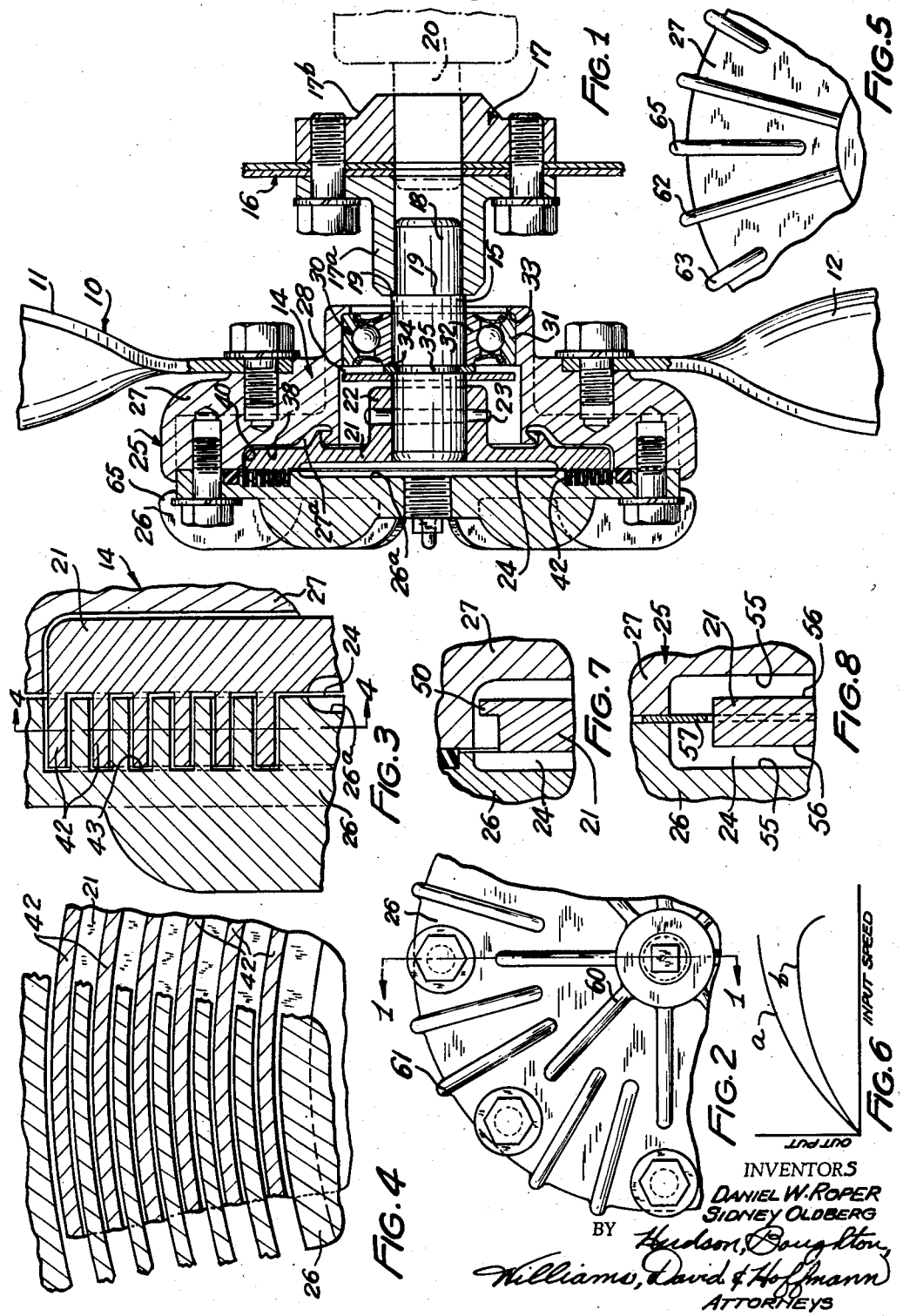
INVENTORS
DANIEL W. ROPER
SIDNEY OLDBERG
BY
Hudson, Boughton,
Williams, David & Hofmann
ATTORNEYS

United States Patent Office 2,948,268
Patented Aug. 9, 1960

2,948,268

ENGINE ACCESSORY AND DRIVE MECHANISM THEREFOR

Daniel W. Roper, Roseville, and Sidney Oldberg, Birmingham, Mich., assignors to Eaton Manufacturing Company, Cleveland, Ohio, a corporation of Ohio Filed Aug. 26, 1957, Ser. No. 680,241

9 Claims. (Cl. 123—41.11)

The present invention relates to an accessory for an internal combustion engine and, more particularly, to the accessory, including a device such as an engine fan and a drive mechanism for driving the device from the engine.

Engine accessories, particularly the generator and fan, are usually driven directly from the engine and the speed of the accessory, in such a case, is dependent on the speed of the engine. It is often desirable, however, not to maintain the same change in accessory speed for corresponding changes as the engine speed increases, but to maintain the accessory speed fairly constant or change the speed in proportionately smaller amounts as the engine speed increases. In the case of the engine fan, for example, it is desirable that the fan first pick up speed rapidly as the engine is started, but as the fan and engine speed increases it is desirable that the increase in fan speed for increases in engine speed taper off so that proportionately the fan is driven at a lower speed ratio at high engine speeds. This is true since in the upper range of engine speed, it is not necessary to drive the fan at a speed directly dependent on engine speed and in most cases substantial horse power is lost and a large amount of noise created by driving the fan at a speed higher than necessary. Those skilled in the art will understand that this is also true of generator operation.

Attempts have been made to provide a drive mechanism between the engine and the engine accessory which would operate to hold speed of the accessory fairly constant for variations in engine speed when the engine is operating in its upper speed range. These mechanisms, however, have largely relied upon speed responsive mechanisms such as flyballs and weights and have not proved entirely reliable as well as being relatively expensive and complicated. Furthermore, in drive mechanisms which utilize fluid type shear couplings, the cooling of the coupling has presented a major problem. In fluid couplings heat built up affects the viscosity of the shear fluid and often at high input speeds to the coupling the output speed thereof will actually drop.

An important object of the present invention is to provide a new and improved simplified and reliable power transmission mechanism for driving an engine accessory, particularly the engine fan.

Another object is to provide, in an internal combustion engine, an accessory drive mechanism of the type referred to in which a fluid coupling operates to effect a relatively high rate of change in accessory speed for changes in engine speed when the engine is operating in its lower speed range and smaller changes in accesory speed for changes in engine speed when the engine is operating in its upper speed range, the power transmission characteristics of the coupling being obtained by its inherent operating characteristics rather than by the use of speed responsive mechanisms and devices and being such that the speed of the fan does not drop materially at high engine speed.

Another object of the present invention is to provide a new and improved reliable, long-life fan accessory for an internal combustion engine, which accessory includes a fan and a power transmission fluid coupling for connecting the fan to be driven from the engine and is so constructed and arranged that fan wobble, and, in turn, the problem of fan clearance and interference are substantially minimized and so that noise due to the fan drive is greatly reduced.

A further object of the present invention is to provide a new and improved shear-type fluid coupling for driving an engine fan carried by the output element of the coupling and in which the output element is rotatably supported by a single bearing mount and in which axial and oscillatory vibrations of the output element which would adversely affect the bearing mount are damped by the coupling.

Another object of the present invention is to provide a new and improved accessory for an automobile engine in which a device, such as a fan, to be driven from the engine, is connected to the engine by a shear type fluid coupling having a shear fluid therein, which coupling has a torque transmitting characteristic such that a detrimental loss of accessory operating speed does not occur at higher operating speeds of the engine.

Certain of the above objects and others which will be apparent from the following description of the preferred embodiment of the present invention are accomplished by utilizing in an engine accessory which is connected to be driven from the engine by a shear-type fluid coupling a silicone oil as the viscous shear fluid to give the coupling a power transmission characteristic such that the speed of the output element increases rapidly with the speed of the input element in the lower speed range and as input speed increases the output element obtains a speed where further increases in input speed do not effect a corresponding change in the output speed of the element, the coupling preferably being air cooled to prevent heat build-up in the coupling.

Others of the above objects are accomplished in the preferred embodiment by providing in a shear-type fluid coupling having a rotatable output element supported by a single bearing mount and connected directly to a device, such as an engine fan, to be driven by the coupling, the coupling having a first rotatable element and a second rotatable element constituting the input and output elements with the second element having portions extending on opposite sides of the first element and defining a fluid chamber about the first element with part of the internal wall of the fluid chamber being disposed with reference to the first element to cooperate therewith and with fluid means in the chamber to provide a shear-type fluid coupling and to provide a restricted passage or tortuous path for fluid flowing from one side to the other side of the first element past the periphery thereof. The described construction causes the viscous fluid within the coupling to function as a damping fluid as well as a torque transmitting fluid.

Other objects and advantages of the present invention will be apparent from the following detailed description of the preferred embodiment made with reference to the accompanying drawings forming a part of this specification, and in which:

Fig. 1 is a sectional view through an accessory embodying the present invention, the accessory comprising a fan and a shear-type fluid coupling for connecting the fan to the engine;

Fig. 2 is a fragmentary elevational view looking at the left-hand side of Fig. 1;

Fig. 3 is an enlarged fragmentary sectional view of a portion of Fig. 1;

Fig. 4 is a fragmentary sectional view with parts cut away taken approximately along line 4—4 of Fig. 3;

Fig. 5 is a fragmentary elevational view of right hand side of the coupling shown in Fig. 1; and Fig. 6 is a diagram showing the optimum speed for a fan as compared to engine speed and also showing the effect of heat built up on fan speed.

Figs. 7 and 8 are fragmentary sectional views showing alternative constructions for providing a restricted passageway between opposite sides of the drive disk of the coupling shown in Fig. 1.

The present invention provides an accessory for an internal combustion engine which includes a device, such as a fan or generator, and a drive mechanism for the device. In the present invention the device driven from the engine is connected to the engine by a coupling which causes the device to change speed rapidly with changes in speed of the engine while the engine is operating in its lower speed range and as the speed of the engine increases the corresponding change in the speed of the device for changes in engine speed decreases, so that speed of the device does not follow directly the speed of the engine. This, according to the invention, is accomplished without the use of special devices or speed responsive mechanisms, but by utilizing silicone oil as the fluid in the coupling and preferably by constructing the coupling to properly cool the oil.

A further aspect of the present invention provides a fluid coupling wherein the fluid medium functions to dampen vibration because the coupling is constructed to restrict the free flow of the medium.

Referring to the drawing, the accessory for an engine, not shown in the drawings, comprises a fan 10 including blades 11, 12 for cooling the engine. The fan 10 is connected to be driven from the engine, by a shear-type fluid coupling 14 having an input shaft 15 driven, in the illustrated embodiment, from the associated engine by a belt drive not shown in full in the drawing but including a pulley assembly 16 having a hub 17 which is shown in Fig. 1. The hub 17 is formed of two separable members 17a, 17b, bolted together and having an axial opening therethrough. The member 17a is pressed onto a reduced end portion 18 of the shaft 15 and abuts a shoulder 19 formed at the inner end of the reduced end portion 18, while the member 17b is pressed onto a stub shaft 20 rotatably supported by the engine block.

In addition to the input shaft 15 the fluid coupling 14 comprises a drive disk 21 having a hub portion 22 fixed, in the illustrated embodiment, by a pin 23 to the input shaft 15 for rotation therewith. The disk 21 may be held against axial movement in any suitable manner, mechanical or otherwise, so as to function as a reaction member in the manner described hereinafter. The drive disk 21 is disposed within a fluid chamber 24 formed in an output element 25 of the coupling 14 supported on the shaft 15 for rotation with respect thereto.

The output element 25 is formed by two separate members 26, 27, each circular in cross section and bolted together adjacent the periphery to form the output element 25. The adjacent radially extending faces of the members 26, 27 are recessed as indicated at 26a, 27a to form the fluid chamber 24. The member 27 has an axially extending bored opening 28 therein which extends through the member 27 and communicates with the chamber 24 and receives the hub 22 of the drive disk 21 and the input shaft 15.

The output element 25 is rotatably supported on the input shaft 15 by an antifriction bearing 30, a ball bearing in the preferred and illustrated embodiment, positioned in the opening 28. The ball bearing 30 has an outer race 31 which fits tightly within the opening 28 and an inner race 32 which fits tightly on the input shaft 15. The end portion of the opening 28 communicating with the outer side of the member 27 is of smaller diameter than the portion of the opening in which the bearing 30 is positioned to provide a shoulder 33 which engages the outer race 31 of the bearing and limits the outward axial movement of the bearing 30. The bearing 30 is held against axial movement in an inward direction on the shaft 15 by a snap ring 34 disposed in a groove 35 adjacent the inner side of the inner bearing race 32.

The fluid chamber 24 formed by the members 26, 27 of the output element 25 has internal walls which are spaced from but closely follow the sides and contour of the outer radial portion of the drive disk 21. The recessed portion 27a of the member 27 includes a radially extending surface 38 which is opposed and parallel to the right-hand side of the drive disk 21, as the disk is viewed in Fig. 1, and an axially extending cylindrical surface 40 encircling the outer peripheral edge of the drive disk 21 and forming a part of the cylindrical side wall of the fluid chamber 24.

In the preferred embodiment of the present invention the side of the outer radial portion of the drive disk 21 adjacent the member 26 of the output element 25 carries a plurality of radially spaced, annular flanges or abutments 42 which extend axially from the drive disk 21 into radially spaced annular grooves in the adjacent side of the member 26 as is best shown in Figs. 3 and 4. The flanges 42 are received in individual grooves 43 and are spaced from the member 26 at all points.

The surfaces 38, 40 of the member 27 and the surfaces of the adjacent portion of the member 26 and of the grooves 43 cooperate with the adjacent opposing surfaces of the drive disk 21 and with fluid means within the chamber 24 to drive the output element 25 upon rotation of the input shaft 15. The fluid means in the chamber 24 is thrown by centrifugal force to the outer portion of the chamber 24 upon rotation of the input shaft 15 and forms a shear fluid type drive between the shaft 15 and the element 25.

The fluid means within the chamber 24 is, according to one aspect of the present invention, a silicone oil. It has been found that when a silicone oil is utilized within the chamber 24 the speed of the output element 25 picks up rapidly as the speed of the input shaft 15 is increased upon starting the shaft from a dead stop position or increasing the speed thereof from a low speed. The change of the speed of the output element, however, with a unit increase in speed of the input shaft 15 will decrease as the speed of shaft 15 increases so that the fan is being driven at a proportionately slower speed as compared with the engine speed. It is believed that this characteristic of maintaining the output speed for the coupling 14 as the input speed of shaft 15 varies through a range of speeds which correspond to the higher operating speed range of the conventional automotive engine is a characteristic unique to couplings utilizing silicone oils. When other oils or viscous liquids commonly used in shear type fluid couplings are utilized in a coupling for connecting an engine accessory, such as the fan 10 to an automotive engine, the power transmitted and the actual speed of the output coupling 25 will drop when the engine is operating in its higher speed ranges due to the loss of viscosity characteristics when operating at higher speeds. The curves of Fig. 6 compare the operation of a fan driven by a coupling 14 embodying silicone oil with the desired operating characteristics of a fan driven by a coupling utilizing other conventional type shear fluids. Referring to Fig. 6, curve *a* shows the optimum fan speed for the entire range of engine speeds and the curve *a* can be closely approximated by using a silicone oil in the coupling 14. Curve *b* shows the speed characteristics obtained when the shear characteristics are lost at higher speeds, as when conventional type oils or fluids are used within the coupling 14 and when the heat build-up adversely affects the viscosity of the oil. It will be noted from the curve b that the actual speed of the fan drops considerably at higher engine speeds making a coupling having such a characteristic curve unsuitable for use with an automotive engine.

In the preferred and illustrated embodiment the blades 11, 12 of the fan 10 are bolted directly to the outer side of the member 27 of the output coupling 25 so as to rotate therewith. It will be understood, therefore, that vibrations, both lateral and rocking vibrations, of the fan 10 would normally be transmitted to the bearing 30 and adversely affect the life of the bearing. In the preferred construction, however, the flanges 42 and the grooves 43 cooperate to provide a restricted path for the flow of shear fluid in the chamber 24 past the outer peripheral edge of the drive disk 21 and between the opposite sides of the disk. This restricted flow path during the operation of the coupling 14 causes the shear fluid within the coupling to function as a damping medium to damp the lateral and rocking vibrations due to the operation of the fan 10. Since the disk 21 is held against axial movement, the disk will serve as a reaction member for lateral forces transmitted through the fluid in the chamber 24. In units which have been tried without the damping effect produced by the fluid medium in the chamber 24 and the disk 21, early bearing failure is experienced.

Figs. 7 and 8 show alternative constructions for restricting the flow of the fluid within the chamber 24 past the outer periphery of the drive disk 21 and between the opposite sides thereof. In the construction shown in Fig. 7 the outer radial portion of the drive disk 21 is formed with straight radially extending sides and without the annular flanges 42. The peripheral edge, however, of the disk 21 is formed with a radially extending flange portion 50 which extends to a point closely adjacent the cylindrical side wall of the fluid chamber 24 formed by the surface 40 of member 27. It will be noted that the clearance between the radial sides of the drive disk 21 and the adjacent internal walls of the chamber 24 is greater than the clearance between the flange 50 and the cylindrical side wall of the chamber 24. The flange 50 and the side wall of the chamber 24 cooperate to provide a restricted passage for fluid flow between the opposite sides of the disk 21 past the outer periphery thereof. This will cause the fluid within the chamber 24 to function as a damping medium in the same manner as the first described construction.

In the construction shown in Fig. 8 the members 26, 27 are formed with symmetrical recesses in their adjacent sides which define radially extending walls 55 that are opposed and parallel to radially extending sides 56 of the drive disk 21. The cylindrical side wall of the fluid chamber 24 is disposed so that the clearance between the cylindrical side wall and the outer periphery is greater than the clearance between the radial sides of the disk 21 and the walls 55. Means, however, is provided for restricting the fluid flow between the opposite sides of the drive disk 21 past the outer periphery thereof and comprises an annular plate 57 clamped between the parts 26, 27 and having a central opening slightly greater than the diameter of the drive disk 21. The annular plate 57 restricts the fluid flow between the opposite sides of the drive disk 21 and causes the shear fluid in the chamber 24 to function as a damping medium for vibrations and oscillations due to the fan 10.

During operation heat will be generated within the coupling 14, and if sufficient heat build-up occurs in the coupling, the viscosity of the shear fluid will be adversely affected and the speed of the fan will drop from the desired operating speed. The outer side of the member 26 is preferably, therefore, formed with a plurality of radially extending fins 60, 61 for creating cooling air currents. The fins 60 are equally spaced about the axis of rotation of the element 25 and extend radially from the axis to a point short of the periphery of the member 26. The fins 61 extend from a point radially inward of the outer end of the fins 60 to the outer periphery of the member 26 and two fins 61 are disposed between each pair of adjacent fins 60. The fins 60, 61 form a centrifugal fan for cooling the coupling 14 and the fan 10 acts as a shroud for the centrifugal fan formed by the fins.

The member 27 is also provided with radially extending fins which function as a centrifugal fan. The section of Fig. 1 is taken through fins 62 which extend from the opening 28 to the outer periphery of the member. The member 27 is also provided with radial fins 63 adjacent the outer periphery as is best shown in Fig. 5. The fins 61, 62, and 63 all extend beyond the peripheral edge of the body proper of the member on which the fins are formed and each have a portion 65 extending across and outwardly from the peripheral edge of the corresponding members.

The present invention has been described as embodied in a fan accessory and drive mechanism therefor for an internal combustion engine. It will be understood, however, that a coupling embodying a silicone oil as disclosed herein finds utility wherever it is desirable to drive a driven element at increasing smaller or slower speed ratios as the input speeds of the prime mover after the output element has obtained a particular speed. Similarly, the described constructions which cause the fluid means within the coupling 14 to act as a damping medium will find utility in couplings where one of the input or output elements of the coupling is subject to undesired vibrations or oscillations. This particular feature, however, is especially suitable for use in fan drives for internal combustion engines as disclosed herein.

It can now be seen that the present invention provides, in one of its aspects, a new and improved shear type fluid coupling which can be used with a variable speed prime mover to drive a device to be driven and to drive the device at a progressively smaller or slower speed ratio as the speed of the prime mover is increased. Furthermore, another aspect of the present invention provides a fluid type coupling in which the fluid means also functions as a damping medium to enable an increase in bearing life to be obtained and to permit the use of a single bearing mount for one of the elements of the coupling when it would otherwise be unfeasible.

While the preferred embodiment and alternative constructions of the present invention have been described in considerable detail, it is hereby my intention to cover all modifications, constructions and arrangements which fall within the ability of those skilled in the art and the spirit and scope of the described invention.

What we claim is:

1. In an engine having an engine fan, drive means for said fan comprising a shaft driven from said engine, a drive disk connected to said shaft for rotation therewith, a chamber member defining a fluid chamber about said disk, a single anti-friction bearing mount rotatably supporting said chamber member on said shaft, said chamber having internal wall surfaces closely following but spaced from the outer surfaces of the outer peripheral portion of said disk, fluid means within said chamber cooperating with said surfaces to provide a shear drive between said members, said disk and said chamber member having cooperating portions for restricting fluid flow between the opposite sides of said disk past the outer periphery thereof, means for driving said shaft, and means for connecting said fan to said chamber member so as to be carried thereby.

2. An engine cooling fan accessory comprising a shaft, a member defining a chamber coaxial with said shaft and having side walls extending generally transversely of said shaft, said shaft extending through one of said walls, a single bearing mount associated with one of said walls and supporting said member in a centilevered manner for rotation relative to said shaft, an engine cooling fan carried by said member, a disk within said member and supported on said shaft for rotation therewith, fluid means within said chamber, said chamber having internal walls adjacent the outer peripheral portion of said disk and cooperating therewith and with said fluid means to provide a shear-type fluid drive.

3. An engine fan accessory including a fan and comprising a first rotatable member, a second rotatable member disposed for rotation about the axis of rotation of said first rotatable member and having portions extending on opposite sides of said first rotatable member and defining a fluid chamber enclosing the outer periphery of at least part of said first rotatable member, fluid means within said chamber, said second rotatable member having spaced opposed surfaces on opposite sides of said first rotatable member cooperating with said fluid means to provide a shear-type fluid drive between said members on rotation of said first rotatable member, and means mounting said fan directly on said second rotatable member so as to be supported thereby and rotatable therewith.

4. A fluid coupling comprising a first rotatable member, a second rotatable member having portions extending on opposite sides of said first rotatable member and defining a fluid chamber encompassing at least the outer periphery of a portion of said first rotatable member, fluid means within said chamber, said members being coaxial and being supported in coaxial relationship by bearing means consisting of a single bearing mount disposed between the members and comprising antifriction bearing means including a plurality of rotatable elements and said first and second rotatable members having spaced opposed surfaces adjacent said outer periphery cooperating with said fluid means to provide a shear-type fluid drive to rotate one of said rotatable members upon rotation of the other of said rotatable members.

5. A fluid coupling comprising a first rotatable member, a second rotatable member having portions extending on opposite sides of said first rotatable member and defining a fluid chamber encompassing at least the outer periphery of a portion of said first rotatable member, fluid means within said chamber, said members being coaxial and being supported in coaxial relationship by bearing means consisting of a single bearing mount disposed between the members and comprising antifriction bearing means including a plurality of rotatable elements and said members having spaced opposed surfaces cooperating with said fluid means to provide a shear-type fluid drive to rotate said one of said members upon rotation of the other of said members and to provide a resisting force to relative rocking on said bearing means of said members about an axis transversely of their axis of relative rotation.

6. A fluid coupling comprising a first rotatable member, a second rotatable member having portions extending on opposite sides of said first rotatable member and defining a fluid chamber encompassing at least the outer periphery of a portion of said first rotatable member, fluid means within said chamber, said members being coaxial and being supported in coaxial relationship by bearing means consisting of a single ball bearing mount disposed between the members, said members having spaced opposed surfaces cooperating with said fluid means to provide a shear-type fluid drive to rotate said one of said members upon rotation of the other of said members and to provide a resisting force to relative rocking on said bearing means of said members about an axis transversely of their axis of relative rotation.

7. A coupling unit comprising a shaft having a first member thereon extending transversely of said shaft and rotatable therewith, a second member having portions on opposite sides of said first member and defining a fluid chamber encompassing at least the outer periphery of said first member, means supporting said shaft and said second member in coaxial relationship and for rotation relative to each other consisting of a single antifriction bearing disposed between said second member and shaft to one side of said first member and including a plurality of rotatable elements coaxial with said shaft, and fluid means within said chamber, said members having opposed surfaces within said chamber cooperating with said fluid means to provide a shear-type fluid drive for rotating one of said members on the rotation of the other of said members and to provide a resisting force to relative rocking on said bearing of said shaft and said second member about an axis extending transversely of said shaft.

8. A coupling unit comprising a shaft having a first member thereon extending transversely of said shaft and rotatable therewith, a second member having portions on opposite sides of said first member and defining a fluid chamber encompassing at least the outer periphery of said first member, means supporting said shaft and said second member in coaxial relationship for rotation relative to each other consisting of a single ball bearing disposed between said second member and shaft to one side of said first member and including a plurality of rotatable balls coaxial with said shaft, and fluid means within said chamber, said members having opposed surfaces within said chamber cooperating with said fluid means to provide a shear-type fluid drive for rotating one of said members on the rotation of the other of said members and to provide a resisting force to relative rocking on said bearing of said shaft and said second member about an axis extending transversely of said shaft.

9. An engine-cooling fan accessory comprising a shaft, a member defining a chamber coaxial with said shaft and having side walls extending generally transversely of said shaft, said shaft extending through one of said side walls, a single ball bearing mount associated with one of said walls and supporting said member in a centilevered manner for rotation relative to said shaft, an engine-cooling fan carried by said member, a disk within said member and supported on said shaft for rotation therewith, and fluid means within said chamber, said chamber having internal walls adjacent said disk and cooperating therewith and with said fluid means to provide a shear-type fluid drive and a resisting force to relative rocking movement of said shaft and member on said bearing mount about an axis transversely of said shaft.

References Cited in the file of this patent

UNITED STATES PATENTS

| 1,238,447 | Severy | Aug. 28, 1917 |
| 1,482,167 | Varley | Jan. 29, 1924 |
| 1,894,574 | Shaw | Jan. 13, 1933 |
| 2,223,715 | Berger | Dec. 3, 1940 |
| 2,289,440 | Kugel | July 14, 1942 |
| 2,406,486 | Bonham | Aug. 27, 1946 |
| 2,629,472 | Sterner | Feb. 24, 1953 |
| 2,743,792 | Ransom | May 1, 1956 |
| 2,838,244 | Oldberg | June 10, 1958 |

Notice of Adverse Decision in Interference

In Interference No. 91,838 involving Patent No. 2,948,268, D. W. Roper and S. Oldberg, Engine accessory and drive mechanism therefor, final judgment adverse to the patentees was rendered Sept. 21, 1962, as to claim 3.
[*Official Gazette November 6, 1962.*]